US009478071B2

(12) United States Patent
Hilton

(10) Patent No.: US 9,478,071 B2
(45) Date of Patent: Oct. 25, 2016

(54) ANTI FARE EVASION SYSTEM

(75) Inventor: David Gareth Hilton, Huddersfield (GB)

(73) Assignee: EchoStar UK Holdings Limited, Steeton (GB)

( * ) Notice: Subject to any disclaimer, the term of this patent is extended or adjusted under 35 U.S.C. 154(b) by 321 days.

(21) Appl. No.: 13/033,496

(22) Filed: Feb. 23, 2011

(65) Prior Publication Data

US 2011/0313821 A1 Dec. 22, 2011

(30) Foreign Application Priority Data

Jun. 21, 2010 (EP) .................................... 10251119

(51) Int. Cl.
*G06Q 10/02* (2012.01)
*G07B 15/00* (2011.01)
*G07C 11/00* (2006.01)

(52) U.S. Cl.
CPC ............... *G07B 15/00* (2013.01); *G07C 11/00* (2013.01)

(58) Field of Classification Search
CPC ....... G06Q 10/02; G06Q 10/10; G07B 15/02
USPC ............ 705/13; 235/382, 384; 382/103, 118
See application file for complete search history.

(56) References Cited

U.S. PATENT DOCUMENTS 6,636,256 B1 * 10/2003 Passman et al. .............. 348/143
8,118,223 B2 * 2/2012 Hammad ............. G06Q 20/045 235/375
2002/0140553 A1 10/2002 Bachtiger et al.
2003/0158762 A1 * 8/2003 Wu .................................. 705/5
2004/0015475 A1 * 1/2004 Scheepsma ............ G07B 15/02
2004/0117638 A1 * 6/2004 Monroe ........................ 713/186
2004/0133464 A1 * 7/2004 Erskine ........................... 705/13
2005/0056696 A1 * 3/2005 Green et al. .................. 235/384
2005/0092831 A1 * 5/2005 Sandoval et al. ............. 235/382
2006/0055512 A1 * 3/2006 Chew ........................... 340/5.82
2007/0050199 A1 * 3/2007 Ishibashi ................ G06Q 99/00 705/5
2007/0106892 A1 * 5/2007 Engberg ........................ 713/168
2007/0265891 A1 * 11/2007 Guo .................................. 705/5
2007/0269082 A1 * 11/2007 Matsuyama .................. 382/118
2007/0284481 A1 * 12/2007 Linero ........................ 244/137.1
2008/0037827 A1 * 2/2008 Corcoran et al. ............. 382/103
2008/0195257 A1 * 8/2008 Rauch ....................... B61B 1/02 701/1

(Continued)

FOREIGN PATENT DOCUMENTS

| | | | | |
|---|---|---|---|---|
| DE | 19915537 | * | 8/2000 | ............. G07B 15/00 |
| GB | 2424743 | | 10/2006 | |
| JP | 404264689 | * | 9/1992 | ............. G07C 11/00 |

OTHER PUBLICATIONS

European Search Report and Written Opinion dated Nov. 26, 2010, EP 10251119.3, 7 pages.

*Primary Examiner* — Brian Epstein
(74) *Attorney, Agent, or Firm* — Kilpatrick Townsend & Stockton LLP

(57) ABSTRACT

A system for monitoring passengers on a vehicle includes one or more detectors for detecting passenger data including one or more passenger identification properties. A computer system receives data from the detectors and uniquely identifies each passenger based on the one or more passenger identification properties. A device receives fare data indicative of whether a passenger has paid the correct fare, and uses the fare data, passenger identity and passenger data from the computer system to indicate which passengers have paid the correct fare.

18 Claims, 4 Drawing Sheets

(56) References Cited

U.S. PATENT DOCUMENTS

| | | | | |
|---|---|---|---|---|
| 2008/0198228 | A1* | 8/2008 | Rizk | 348/148 |
| 2008/0201212 | A1* | 8/2008 | Hammad et al. | 705/13 |
| 2009/0090772 | A1* | 4/2009 | Lee | 235/382 |
| 2009/0132128 | A1* | 5/2009 | Marriott et al. | 701/45 |
| 2010/0039224 | A1 | 2/2010 | Okude et al. | |
| 2010/0224727 | A1* | 9/2010 | Bauer et al. | 244/118.5 |
| 2010/0290677 | A1* | 11/2010 | Kwan | 382/118 |
| 2010/0308966 | A1* | 12/2010 | Oki et al. | 340/10.1 |
| 2011/0082714 | A1* | 4/2011 | Gaikwad | 705/5 |
| 2012/0296709 | A1* | 11/2012 | Derasmo et al. | 705/13 |

* cited by examiner

ANTI FARE EVASION SYSTEM

CROSS-REFERENCE TO RELATED APPLICATION

This application claims priority under 35 U.S.C. §119(b) to European Patent Application No. EP 1025111.9 filed on Jun. 21, 2010, which is hereby incorporated by reference herein in its entirety.

TECHNICAL FIELD

This application relates to monitoring passengers on a vehicle to ensure that they have not evaded paying for a journey or portion of a journey that they are not entitled to.

BACKGROUND

Transportation systems, particularly public transportation systems such as train, tram, underground, bus or coach systems rely on passengers paying a fare in order to travel. There are many different charging schemes that may be implemented, such as paying to travel a particular distance, a particular number of stops or to a particular location. The result is that in return for paying a particular fare, the passenger is entitled to travel on the vehicle to their desired destination.

Many transportation systems rely on conductors to ensure passengers have paid the correct fare for their journey. The conductor will patrol the vehicle checking to ensure each passenger's ticket is valid for the terms of their travel. The conductor may also have a ticket machine for issuing tickets. Tickets may be physically issued, in the form of card or paper tickets, or they may be provided electronically such as to a mobile phone, personal data assistant (PDA) or any other mobile device. Unfortunately it is difficult for a conductor to keep track of all the passengers, especially when the vehicle stops at a number of different locations along a route at which passengers can exit or enter the vehicle. This can result in passengers evading their fare by not buying a ticket, or travelling a further distance than their ticket entitles them to. Attempts to solve this problem include the use of barriers at train stations to only let through those with correct tickets, but the barriers still need to be supervised and there are still many train stations without ticket barriers.

SUMMARY

Embodiments of the present disclosure provide a system for monitoring passengers on a vehicle. The system may include one or more detectors, such as cameras, for detecting passenger data, including one or more passenger identification properties, such as facial features. A computer system may be arranged to receive data from the detectors and to uniquely identify each passenger based on the one or more passenger identification properties; such as by performing a facial recognition function by executing facial recognition software. A device, or subsystem, may be arranged to receive data indicative of whether a passenger has paid the correct fare, for example by scanning a passenger's ticket, and to use the fare data and passenger identification data from the computer system to indicate which passengers have paid the correct fare. Other passenger data detected by the one or more detectors may also be used to indicate which passengers have paid the correct fee.

In certain embodiments, the device may be a mobile device, or portable device, arranged to indicate on a display which passengers have paid the correct fare. In other embodiments the device need not be mobile or portable and may be located on the vehicle or at another location away from the vehicle such as a train station.

The computer system and the device may be separate entities, with the device being arranged to receive the passenger data and passenger identity from the computer system. Alternatively, the device may include the computer system and perform any necessary computation itself.

The passenger data detected by the one or more detectors may include positional information on the location of each passenger within the vehicle, the device being arranged to display the location of each passenger within the vehicle.

The detectors may be positioned in a number of different locations, including facing each entrance/exit of the vehicle, or the entrance/exit of a section of the vehicle or covering a passenger seating area.

The device may include an interface for manually inputting data indicative of whether a passenger has paid the correct fare or it may include a scanning device for scanning storage means on a passenger's ticket containing details of the journey paid for by the passenger. In alternative embodiments, one or more ticket scanners may be used for detecting fare data. The device may be arranged to receive fare data from the ticket scanners, which may automatically scan or receive ticket data from the ticket, and to automatically indicate which passengers have paid the correct fare using indication means such as a display device or audio system. This may be achieved using radio frequency detectors for detecting radio frequency tags on the tickets.

An accompanying method, computer system and computer program are also provided.

BRIEF DESCRIPTION OF THE DRAWINGS

Examples of the present disclosure will now be described in more detail, by way of example, and with reference to the drawings in which.

DETAILED DESCRIPTION OF THE PREFERRED EMBODIMENTS

Figure 1:
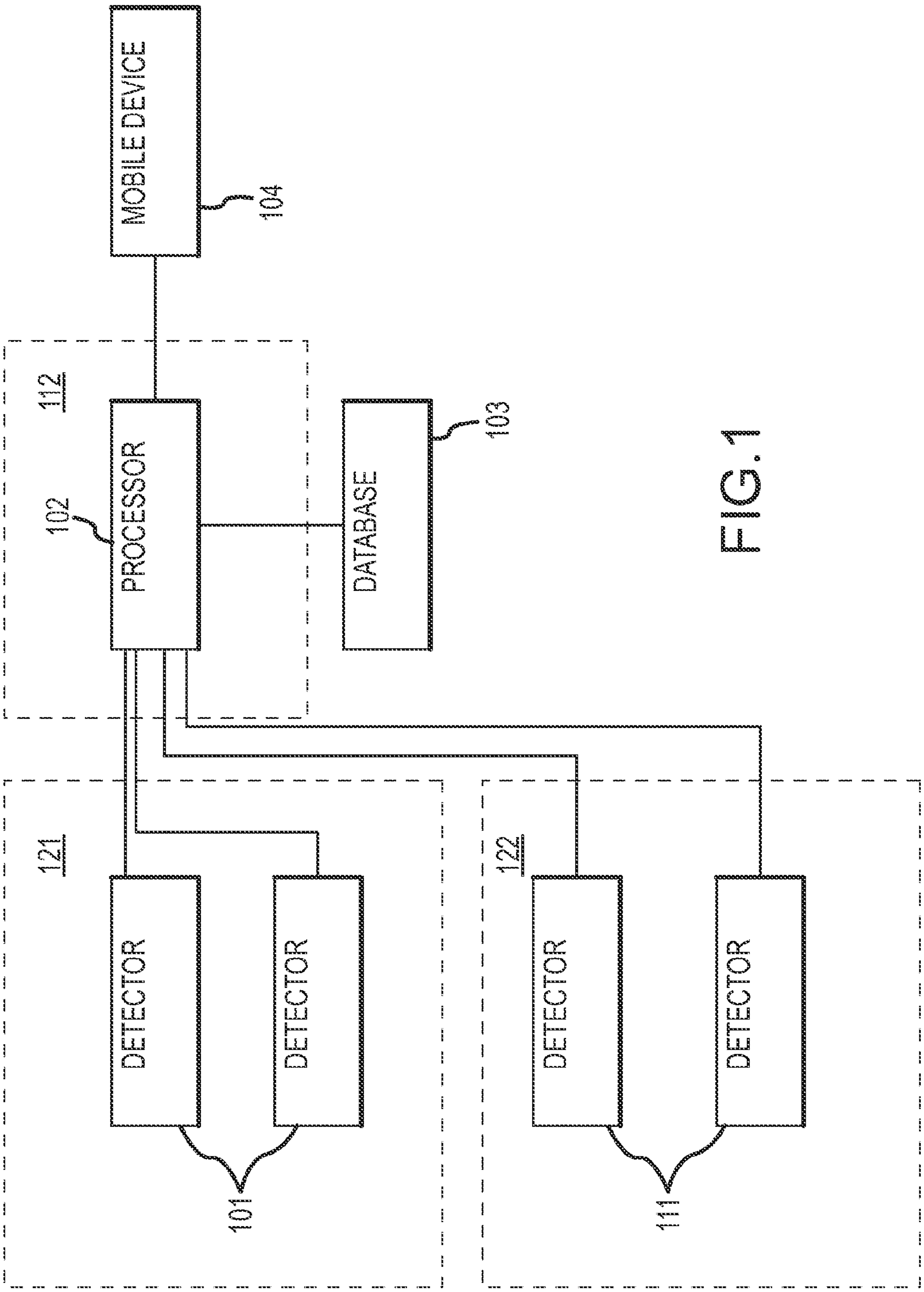
FIG. 1 is a block diagram of a system in accordance with an embodiment of the present disclosure.

FIG. 1 shows an embodiment of a system according to the present disclosure. One or more detectors 101 may be positioned at various locations on a first train carriage 121. Another set of detectors may be positioned at various locations on a second train carriage 122 and in any other carriage intended to carry passengers. The detectors may be used to distinguish individual passengers, to identify their location within a carriage and to track their movement through the carriage and train. Data gathered by the detectors may be passed to a central processor 102 that extracts and calculates particular information. Information from the processor may then be passed to the conductor's handheld device, preferably via a wireless connection.

The detectors 101/111 may be still picture or video cameras such as digital cameras, and may be equipped with wide angle lenses. The detectors may be integrated into the train carriages and positioned in predetermined locations such that they can capture visual images of passengers, and particularly the faces of the passengers. For example, one or more cameras may be positioned facing the entrances to the carriage, or on the back of each seat to face a passenger on the seat behind, or along the walls of the carriage. Alternatively, or in addition, the cameras may be placed at ceiling height, either attached to the ceiling or mounted therein. Since passengers may be sitting in a specific seat, or may be standing, the detectors may be distributed in a plurality of different positions to allow images of passenger faces to be captured in any position. The detectors may be connected to the processor by a hardwired connection; a wireless connection may be used, but a local power supply may be needed for each camera.

The cameras may be placed in predetermined locations and may be arranged to track a passenger from the moment of boarding, while seated and upon exiting a carriage or the train itself. To achieve this, the cameras may also be arranged to cover passengers moving in both directions along the length of the train. The precise layout of cameras depends upon the design of the train and particularly of the train carriages, which vary from country to country and even between different regions or train lines. New trains may be designed so that fewer cameras are required, but to retrofit existing rolling stock may require ten or more cameras per carriage. The style of carriage seating may restrict a particular camera's view in some circumstances, so cameras located in the back of seating may also be used so as to face the passenger sitting in the seat behind.

Figure 2:
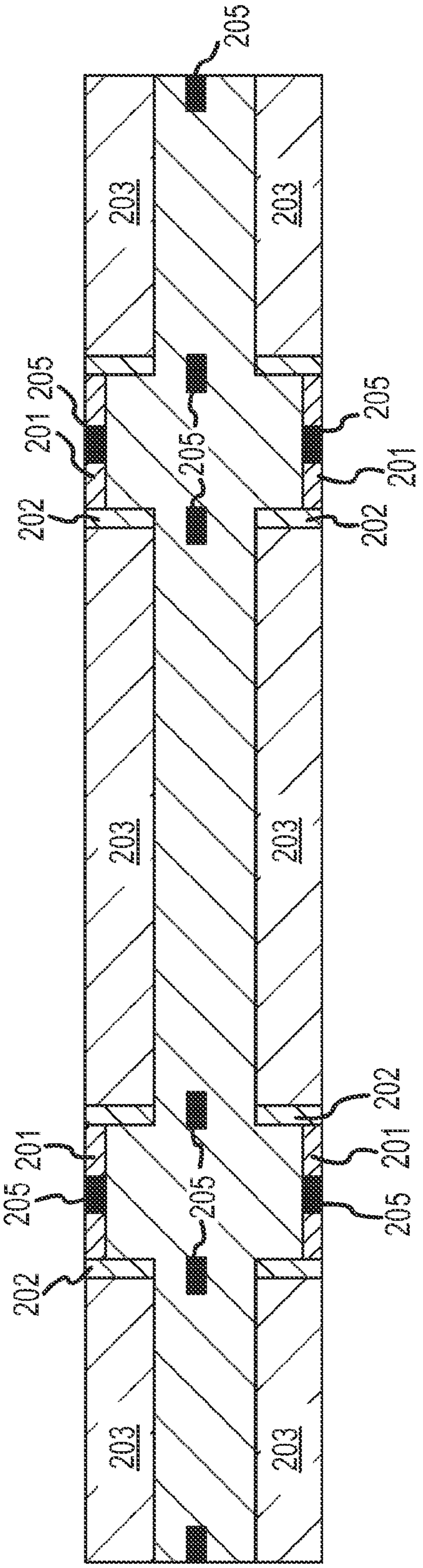
FIG. 2 is a diagram showing a layout of a train carriage identifying the positioning of detectors for an embodiment of the present disclosure.

FIG. 2 shows a diagram of an example layout of a train carriage. Doors 201, which may be sliding doors, may be located at various points along the sides of the carriage, with bulkheads 202 either side. Passenger seating 203 may be provided along both of the carriage sides, with an aisle located between the seating. Cameras 205 may be located at various positions throughout the carriage to maximise the probability of capturing the image of a particular passenger. The cameras may be located primarily around the door areas to image passengers entering or exiting the carriage.

Figure 3:
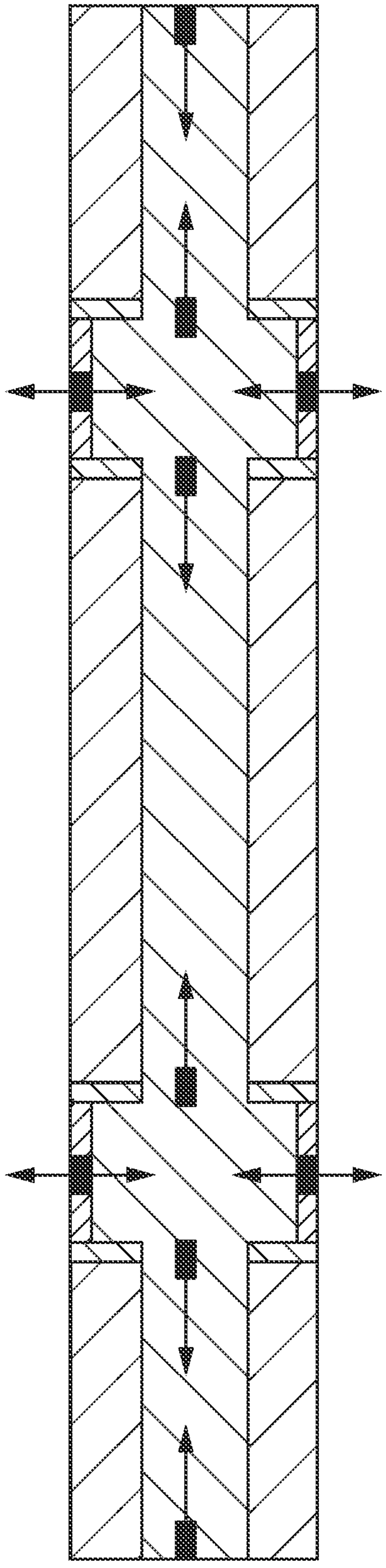
FIG. 3 is a diagram showing the possible detector orientation for the embodiment shown in FIG. 2.

FIG. 3 shows an example of the direction in which each camera may look. Of course, wide angled camera lens may be used and the arrows in FIG. 3 are only intended to give an indication of the direction of view, and not an indication of the viewing angle. Each camera may face in a particular direction, for example along the length of the carriage towards the front or towards the rear of the train. The cameras mounted at the end of each carriage may capture those passengers leaving the carriages for another carriage. The door cameras may be arranged to capture images of passengers entering or exiting the train by facing into the carriage or out of the carriage. In some implementations, two cameras may be mounted in each position to look in opposite directions and maximise coverage. This is shown in relation to the door cameras in FIG. 3. The cameras may be wide angled cameras placed at ceiling height.

The processor, which may form part of a computer system 112, may run facial recognition software to identify each passenger and differentiate passengers from one another. Although identification of each passenger may include comparison of a detected facial profile with stored facial profile information, and extracting pre-existing personal information, such as name and address details, from a database 103, other arrangements are possible without departing from the scope of the present disclosure. However, each passenger may be uniquely identified, or tagged, in relation to all the other passengers so they may be distinguished. The results of the facial recognition software may be used to assign each passenger a profile or identification tag such that various parameters can be assigned to each passenger such as position information. The data obtained by the processor and the information resulting from calculations carried out by the processor may be stored locally, such as in the database 103.

Each time a passenger enters or exits a carriage, one or more detectors may capture their image. Additional detectors throughout a carriage may be used to provide the positional data of passengers within the carriage, since each camera may also provide location information. The processor may use this information to track the position of each passenger within the train. Positional information may be extracted from the detectors simply based upon the location of the detectors. For example, if a passenger is detected by a camera in a particular location, such as facing seat number 17 in a carriage, then the computer system may extract from this data that the passenger is in that particular location.

The system may operate by monitoring changes in the appearance of a train carriage and scanning areas of change for human faces.

- Each camera may be arranged to cover a particular section of the carriage, although it is possible that cameras will have overlapping sections.
- The system may detect a change in a section of carriage by comparing earlier images with later images using image processing techniques and assume that any changes in the image are due to human activity.
- The control system, running facial recognition software, may analyze the region of the image that has changed since the previous image was taken for human faces.
- If a human face is found, and the face is new to the system, the face may be stored in a storage means or database along with carriage position information.
- If a human face is found, but it is not new to the system (it is already stored), the new carriage position information may be updated.

The position of the face, and therefore of the passenger, may be calculated using visual references within the carriage, such as specific markers placed in predetermined positions on the floor, walls or ceiling of the carriages. Alternatively, comparisons between two cameras to extract 3D position information or a 3D camera may be used.

Data analysis may be used to determine the likelihood that a passenger has left a train. This may be determined from the last known position of the passenger, the elapsed time since they were last in that position, and whether they are still in that position. If in the last known position the passenger was moving towards an exit, based on two or more images of the passenger, when the train was at a station, the system may assume the passenger has disembarked the train. The data analysis may be performed by the computer system 112.

Preferably the computer system 112 may be embedded in the pre-existing train computer systems, although it may be possible to use a dedicated computer system. The computer system may also include a wireless receiver and transmitter for communicating with the conductor's mobile device 104.

Alternatively, the computer system may be incorporated into the mobile device 104. In such embodiments the mobile device may be able to receive data directly from the detectors via a wireless transmitter coupled to each detector, or the detectors may be coupled to a routing station having a wireless transmitter for sending data to the mobile device. The database 103 may also be incorporated directly into the mobile device 104.

Using the information from the detectors, the computer system may determine the number of passengers and their locations and thus:

How many passengers are on the whole train.

How many passengers are on an individual carriage.

How many passengers disembarked the train at a particular station.

How many passengers boarded a train at a particular station.

Using additional information provided either via the mobile device 104 or from a database 103, the computer system may also determine:

How many passengers on the train are pass/season ticket holders.

How many passengers are standard ticket holders.

Which passengers have had their ticket checked by the conductor.

Which passengers have traveled beyond their ticket/pass geographical limits.

Which passengers should get off at the next station stop.

The mobile device 104 may be carried by the conductor and include a display panel and interface means such as a keypad or touch sensitive screen for navigating through data or inputting data. The device may also function as a ticket machine, or be integrated into an existing ticket machine, such that the conductor only needs to carry around a single device.

The display panel may display a graphical representation of the carriage that the conductor is currently located in. As the conductor moves through the train, the display on the device may show the conductor's current position in the carriage. The conductor's position may be determined either by using the detectors, as described above in relation to the passengers, or by using the wireless connection between the mobile device and the computer system. The device may map the locations of individual passengers within the carriage and display this information using icons on the screen. The position of the conductor may be tracked by using the facial recognition procedure described above in relation to the passengers. Alternatively, an additional system could be used such as GPS tracking or using radio frequency tags (RFID). For accuracy, using both systems may be an option.

Each passenger may assigned an icon which may be used to differentiate different details assigned to that passenger, for example by using different icons or different colours. Passengers that have had their tickets/passes checked by the conductor may be displayed differently to those who have not had their ticket checked. For example, passengers who have not had their ticket checked may be displayed with red icons, and passengers who have had their ticket checked may be displayed with green icons. Passengers that have traveled beyond their ticket/pass geographical limits, or need to get off at the next stop, may also be displayed differently. The display may allow the conductor to identify passengers that have not had their tickets checked, or passengers who have traveled beyond the limits of their ticket.

When a conductor checks or issues a ticket, they may have the option to enter the type of ticket/pass the passenger has. This may be done manually via the touch screen interface. The mobile device may instead comprise scanning means, such as a bar code, magnetic strip or transponder scanner, so that information on the ticket/pass may be provided to the mobile device by scanning a bar code/magnetic strip/transponder located on the ticket/pass. This may enable the system to identify passengers that have stayed on board the train beyond their tickets limits. When a conductor has checked the ticket, they may change the status of the passenger to "ticket checked" by touching the display device, or the system may automatically update the passenger status. At any time the conductor may access passenger ticket information by selecting a passenger's icon.

The computer system may contain a transmitter for transmitting passenger information and data indicative of whether a passenger has paid the correct fare to a central database. Information collected by the mobile device may be uploaded to the database 103 associated with the on-board computer system 112. This information may than be provided to a central office database for further analysis. The on-board computer system may include a transmitter for transmitting the information wirelessly, such as over a mobile phone network, to a central office. Alternatively the information may be provided directly from the mobile device 104 to the central office database via wireless connection or over a mobile phone network.

Figure 4:
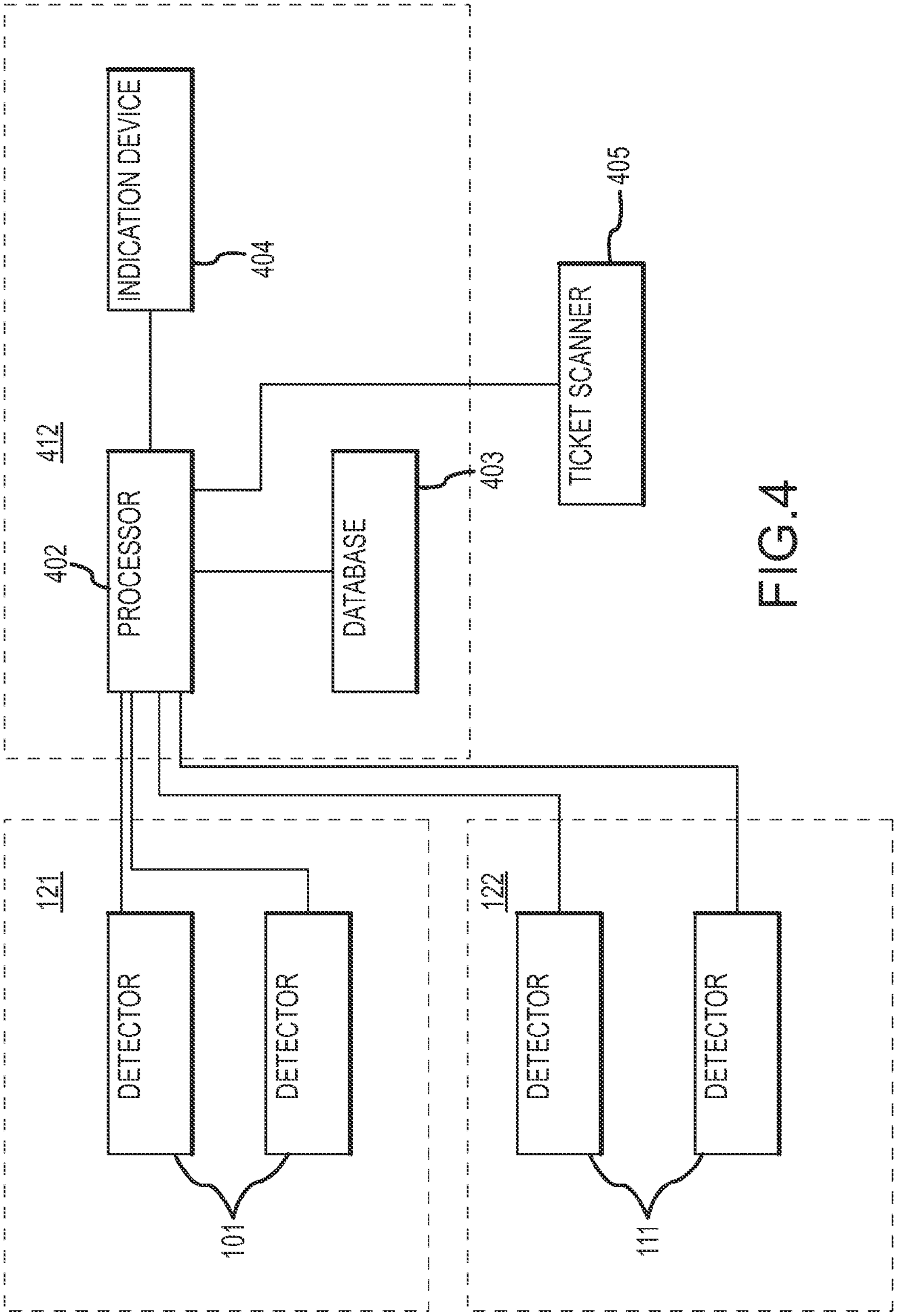
FIG. 4 is a diagram of a system in accordance with an embodiment of the present disclosure.

In alternative embodiments of the present disclosure, the monitoring performed by the conductor may be done at a remote location, either on the train or at some other location such as a train station or central control centre. FIG. 4 shows such an embodiment in which a computer system 412 receives the data from the detectors in the manner described above. The computer system includes a processing means such as processor 402 and a database. An indication device 404 may be provided, being a device arranged to receive fare data indicative of whether a passenger has paid the correct fare and also including indicator means for indicating whether a passenger has paid the correct fare or whether a passenger has not paid the correct fare, or both.

The computer system may be located on the train, or at some other location such as a train station or central control station or distributed amongst several locations. The indicator device may be integral with the computer system, and they may be considered to be a single system, or instead may be located at a different location and connected wirelessly to the computer system. For example, the indicator device may be located at a train station, and the computer system may be located on a train. Alternatively both the computer system and the indicator device may be located at a train station, with the detector information being transmitted to them wirelessly. There may be a plurality of indicator devices, each located in a different train station to alert staff members when a passenger who has not paid the correct fare exits the train.

The fare data may be provided to the indicator device/computer system from a ticket scanner 405, remote from the indicator device over a communication link such as a wireless link. Tickets may be manually scanned either by a conductor using a mobile scanner as described above or by the passengers themselves at a ticket scanning station located, for example, at the entrance to a carriage. The scanning station may be arranged such that the passenger must scan their ticket in order to enter a train carriage. Alternatively the tickets may contain an integral transceiver and/or transmitter device arranged to emit a signal which is detected by a detection system comprising one or more detectors distributed throughout the train. The signal may be an RFID signal, which is detected by an RF detection system. The detection system may be used to provide fare data, encoded in the signal, and location data based on the detector location. The data may then be provided to the computer system or directly to the indicator device. A given ticket may be associated with a particular passenger based on location when scanned or other tagging means such as facial recognition at the point of scanning. In this way, the fare data may be collected in a different location to that of the computer system and device, meaning that the conductor may not need to be present for the fare data to be collected. The device may then automatically indicate which passengers have paid the correct fare without requiring the conductor to walk around the train obtaining fare data.

The indicator device may comprise a screen and operate in the manner described above, allowing a conductor to monitor which passengers have paid the correct fare. The indicator device need not be mobile, since the fare data and passenger information may be transmitted to it as described above. The conductor may therefore monitor the device from a particular location and take action when necessary without needing to constantly patrol the train. Alternatively the indicator device may be arranged to automatically indicate whenever a passenger who has not paid the correct fare exits the train using the received data. This may be done using a display or an audio signal generated by a loudspeaker. Such an embodiment means that a conductor may not be required on the train because the indicator device may alert staff at a train station of the fare evader and they can then take the appropriate action.

The above embodiments of the present disclosure have been described in relation to a train or train carriage. It will be appreciated that embodiments of the present disclosure may be applied to any type of vehicle in which it is desired to monitor whether passengers have paid the correct fare for travel. This may include vehicles such as coaches, buses, tubes/subways, trams, aircraft or boats or any vehicle that uses stations or stops at which passengers can exit or enter.

The invention claimed is:

1. A system for monitoring passengers on a vehicle, the system comprising:

one or more cameras for detecting passenger facial features for each of a plurality of passengers that have boarded the vehicle, wherein the vehicle includes a plurality of carriages;

one or more ticket scanners for detecting fare data paid by each of the plurality of passengers;

a computer system in data communication with the one or more cameras and the one or more ticket scanners, wherein the computer system comprises one or more processors and a wireless transceiver, and wherein the computer system:

receives detector data from the one or more cameras and uniquely identifies each passenger based on the facial features included in the detector data;

assigns each detected passenger a unique identifier based on the passenger facial features;

stores the unique identifier associated with each of the plurality of passengers to a database;

assigns icons to each of the plurality of passengers by:

determining first data corresponding to first fares paid by first passengers of the plurality of passengers, wherein determining the first data includes receiving data from the one or more ticket scanners;

storing the first data to the database in association with unique identifiers assigned to the first passengers;

determining that the first data is indicative of the first passengers paving correct fares upon boarding the vehicle;

assigning a first icon for the first passengers, wherein the first icon is associated with passengers paying correct fares;

determining second data corresponding to second fares paid by second passengers of the plurality of passengers, wherein determining the second data includes using data received from the one or more ticket scanners;

storing the second data to the database in association with unique identifiers assigned to the second passengers;

determining that the second data is indicative of the second passengers paying incorrect fares upon boarding the vehicle;

assigning a second icon for the second passengers, wherein the second icon is associated with passengers paying incorrect fares;

determining third data corresponding to determinations of third passengers of the plurality of passengers having associated tickets or passes checked while on the vehicle;

storing the third data to the database in association with unique identifiers assigned to the third passengers;

assigning a third icon for the third passengers, wherein the third icon is associated with passengers having tickets or passes checked while on the vehicle;

determining fourth data corresponding to determinations of fourth passengers of the plurality of passengers having traveled beyond approved limits while on the vehicle;

storing the fourth data to the database in association with unique identifiers assigned to the fourth passengers; and assigning a fourth icon for the fourth passengers, wherein the fourth icon is associated with passengers having traveled beyond approved limits while on the vehicle;

tracks movements and locations on the vehicle of each of the plurality of passengers by periodically determining locations of each passenger using the detector data from the one or more cameras and locations of the one or more cameras and storing the periodically determined locations of each passenger to the database in association with the unique identifier for the passenger; and determines a particular carriage of the plurality of carriages that a mobile device is located in, wherein the mobile device is associated with a conductor of the vehicle, and wherein determining which of the plurality of carriages the mobile device is located in includes using the detector data to determine a location of the conductor; and the mobile device, wherein the mobile device retrieves a first map corresponding to a first layout of a first carriage of the plurality of carriages when the computer system determines that the location of the mobile device is in the first carriage;

displays the first map on a display device of the mobile device;

retrieves, using a mobile wireless transceiver of the mobile device, locations for each of the plurality of passengers that are located in the first carriage;

displays icons for each of the plurality of passengers located in the first carriage, wherein the icons are selected from the first icon associated with passengers paying correct fares, the second icon associated with passengers paying incorrect fares, the third icon associated with passengers having tickets or passes checked while on the vehicle, and the fourth icon associated with passengers having traveled beyond approved limits while on the vehicle, and wherein the icons corresponding to each passenger located in the particular carriage are displayed at positions on the first map according to the locations of the passengers based on the tracking of movements and locations on the vehicle of each of the plurality of passengers;

retrieves a second map corresponding to a second layout of a second carriage of the plurality of carriages when the computer system determines that the location of the mobile device changes to the second carriage, displays the second map on the display device of the mobile device;

retrieves, using the mobile wireless transceiver, locations for each of the plurality of passengers that are located in the second carriage; and displays icons for each of the plurality of passengers located in the second carriage, wherein the icons are selected from the first icon, the second icon, the third icon, and the fourth icon, and wherein the icons corresponding to each passenger located in the second carriage are displayed at positions on the second map according to the locations of the passengers based on the tracking of movements and locations on the vehicle of each of the plurality of passengers.

2. The system of claim 1, wherein the computer system and the mobile device are separate devices and wherein the mobile device receives passenger data and passenger identity from the computer system.

3. The system of claim 2, wherein the wireless transceiver of the computer system and the mobile wireless transceiver of the mobile device are used for communicating with each other.

4. The system of claim 1, wherein the facial features detected by the one or more cameras are associated with locations of passengers within the vehicle.

5. The system of claim 1, wherein a plurality of the one or more cameras are respectively positioned facing at least one of each entrance/exit of the vehicle, the entrance/exit of a section of the vehicle or a passenger seating area.

6. The system of claim 1, wherein the computer system includes the mobile device.

7. The system of claim 1, wherein the computer system executes facial recognition software to uniquely identify each passenger.

8. The system of claim 7, wherein the facial recognition software is configured to:

compare a first image from a camera with a second later image from the camera to detect a change between a portion of the second later image and the first image;

perform one or more facial recognition functions on the portion of the second later image that has changed relative to the first image;

store unique identifier information in the database along with new passenger location information when a new passenger face is identified; and update the passenger location information in the database when a known passenger face is identified.

9. The system of claim 1, wherein at least one camera is located in at least one different location than the computer system and mobile device and the fare data is collected in the at least one different location.

10. The system of claim 1, wherein the mobile device receives the fare data from the one or more ticket scanners and automatically indicates which passengers have paid a correct fare using at least one of at least one display device or at least one audio system.

11. The system of claim 10, wherein at least one ticket scanner comprises at least one radio frequency detector that detects at least one radio frequency tag.

12. A method for monitoring passengers on a vehicle, the method comprising:

receiving, using one or more processors, detector data from one or more cameras, wherein the detector data corresponds to passenger facial features for each of a plurality of passengers that have boarded the vehicle, and wherein the vehicle includes a plurality of carriages;

assigning each detected passenger a unique identifier based on the passenger facial features;

storing, using the one or more processors, the unique identifier associated with each of the plurality of passengers to a database;

assigning icons to each of the plurality of passengers, wherein assigning includes:

determining, using the one or more processors, first data corresponding to first fares paid by first passengers of the plurality of passengers, wherein determining the first data includes receiving data from one or more ticket scanners;

storing, using the one or more processors, the first data to the database in association with unique identifiers assigned with the first passengers;

determining, using the one or more processors, that the first data is indicative of the first passengers paying correct fares upon boarding the vehicle;

assigning, using the one or more processors, a first icon for the first passengers, wherein the first icon is associated with passengers paying correct fares;

determining, using the one or more processors, second data corresponding to second fares paid by second passengers of the plurality of passengers, wherein determining the second data includes using data received from the one or more ticket scanners;

storing, using the one or more processors, the second data to the database in association with unique identifier assigned to the second passengers;

determining, using the one or more processors, that the second data is indicative of the second passengers paying incorrect fares upon boarding the vehicle;

assigning, using the one or more processors, a second icon for the second passengers, wherein the second icon is associated with passengers paying incorrect fares;

determining, using the one or more processors, third data corresponding to determinations of third passengers of the plurality of passengers having associated tickets or passes checked while on the vehicle;

storing, using the one or more processors, the third data to the database in association with unique identifiers assigned to the third passengers;

assigning, using the one or more processors, a third icon for the third passengers, wherein the third icon is associated with passengers having tickets or passes checked while on the vehicle;

determining, using the one or more processors, fourth data corresponding to determinations of fourth passengers of the plurality of passengers having traveled beyond approved limits while on the vehicle;

storing, using the one or more processors, the fourth data to the database in association with unique identifiers assigned to the fourth passengers; and assigning, using the one or more processors, a fourth icon for the fourth passengers, wherein the fourth icon is associated with passengers having traveled beyond approved limits while on the vehicle;

tracking, using the one or more processors, movements and locations on the vehicle of each of the plurality of passengers, wherein tracking includes periodically determining locations of each passenger using the detector data from the one or more cameras and camera locations of the one or more cameras and storing the periodically determined locations of each passenger to the database in association with the unique identifier for the passenger;

determining that a mobile device is located in a first carriage of the plurality of carriages, wherein the mobile device includes a display device, wherein determining that the mobile device is located in the first carriage includes using the detector data from the one or more cameras to determine a location of a vehicle conductor associated with the mobile device;

retrieving, by the mobile device, a first map corresponding to a first layout of the first carriage;

displaying the first map on the display device of the mobile device;

retrieving, using a wireless transceiver of the mobile device, locations for each of the plurality of passengers that are located in the first carriage;

displaying icons for each of the plurality of passengers that are located in the first carriage on the first map displayed on the display device, wherein the icons are selected from the first icon associated with passengers paying correct fares, the second icon associated with passengers paying incorrect fares, the third icon associated with passengers having tickets or passes checked while on the vehicle, and the fourth icon associated with passengers having traveled beyond approved limits while on the vehicle, and wherein the icons corresponding to each passenger located in the first carriage are displayed at positions on the first map according to the locations of the passengers based on the tracking of movements and locations on the vehicle of each of the plurality of passengers;

determining, using the one or more processors of the mobile device, that the mobile device has moved to a second carriage of the plurality of carriages, wherein determining that the mobile device has moved to the second carriage includes using the detector data from the one or more cameras to determine an updated location of the conductor associated with the mobile device;

retrieving, by the mobile device, a second map corresponding to a second layout of the second carriage;

displaying the second map on the display device of the mobile device;

retrieving, using the wireless transceiver of the mobile device, locations for each of the plurality of passengers that are located in the second carriage; and displaying icons for each of the plurality of passengers that are located in the second carriage on the second map displayed on the display device, wherein the icons are selected from the first icon, the second icon, the third icon, and the fourth icon, and wherein the icons corresponding to each passenger located in the second carriage are displayed at positions on the second map according to the locations of the passengers based on the tracking of movements and locations on the vehicle of each of the plurality of passengers.

13. The method of claim 12, wherein the passenger facial features are transmitted to the mobile device.

14. The method of claim 12, wherein assigning each detected passenger a unique identifier is performed by the mobile device.

15. The method of claim 12, wherein assigning each detected passenger a unique identifier includes performing a facial recognition function to uniquely identify each passenger.

16. The method of claim 15, wherein tracking includes:

comparing a first image from a camera of the one or more cameras with a second later image from the camera to detect a change between a portion of the second later image and the first image;

performing one or more facial recognition functions on the portion of the second image that has changed relative to the first image;

wherein when a new passenger face is identified, a new unique identifier is stored in the database along with passenger location information for the new passenger face; and wherein, when a known passenger face is identified, but it is not new, the passenger location information in the database is updated.

17. A computer program product, comprising:

a set of instructions, stored in at least one non-transitory storage medium, executable by at least one processing unit to perform operations including:

receiving, using the at least one processing unit, detector data from one or more cameras, wherein the detector data corresponds to passenger facial features for each of a plurality of passengers that have boarded a vehicle, and wherein the vehicle includes a plurality of carriages;

assigning each detected passenger a unique identifier based on the passenger facial features;

storing, using the at least one processing unit, the unique identifier associated with each of the plurality of passengers to a database;

assigning icons to each of the plurality of passengers, wherein assigning includes:

determining, using the at least one processing unit first data corresponding to first fares paid by first passengers of the plurality of passengers, wherein determining the first data includes receiving data from one or more ticket scanners;

storing, using the at least one processing unit the first data to the database in association with unique identifiers assigned with the first passengers;

determining, using the at least one processing unit, that the first data is indicative of the first passengers paying correct fares upon boarding the vehicle;

assigning, using the at least one processing unit, a first icon for the first passengers, wherein the first icon is associated with passengers paying correct fares;

determining, using the at least one processing unit, second data corresponding to second fares paid by second passengers of the plurality of passengers, wherein determining the second data includes using data received from the one or more ticket scanners;

storing, using the at least one processing unit, the second data to the database in association with unique identifier assigned to the second passengers;

determining, using the at least one processing unit, that the second data is indicative of the second passengers paying incorrect fares upon boarding the vehicle;

assigning, using the at least one processing unit, a second icon for the second passengers, wherein the second icon is associated with passengers paying incorrect fares;

determining, using the at least one processing unit, third data corresponding to determinations of third passengers of the plurality of passengers having associated tickets or passes checked while on the vehicle;

storing, using the at least one processing unit the third data to the database in association with unique identifiers assigned to the third passengers;

assigning, using the at least one processing unit a third icon for the third passengers, wherein the third icon is associated with passengers having tickets or passes checked while on the vehicle;

determining, using the at least one processing unit, fourth data corresponding to determinations of fourth passengers of the plurality of passengers having traveled beyond approved limits while on the vehicle;

storing, using the at least one processing unit, the fourth data to the database in association with unique identifiers assigned to the fourth passengers; and assigning, using the at least one processing unit, a fourth icon for the fourth passengers, wherein the fourth icon is associated with passengers having traveled beyond approved limits while on the vehicle;

tracking, using the at least one processing unit, movements and locations on the vehicle of each of the plurality of passengers, wherein tracking includes periodically determining locations of each passenger using the detector data from the one or more cameras and camera locations of the one or more cameras and storing the periodically determined locations of each passenger to the database in association with the unique identifier for the passenger;

determining that a mobile device is located in a first carriage of the plurality of carriages, wherein the mobile device includes a display device, wherein determining that the mobile device is located in the first carriage includes using the detector data from the one or more cameras to determine a location of a vehicle conductor associated with the mobile device;

transmitting, to the mobile device, a first map corresponding to a first layout of the first carriage, wherein receiving the first map at the mobile device facilitates displaying the first map on the display device of the mobile device;

transmitting, using a wireless transceiver, locations for each of the plurality of passengers that are located in the first carriage to the mobile device, wherein receiving the locations for each of the plurality of passengers that are located in the first carriage at the mobile device facilitates the mobile device displaying icons for each of the plurality of passengers that are located in the first carriage on the first map displayed on the display device, wherein the icons are selected from the first icon associated with passengers paying correct fares, the second icon associated with passengers paying incorrect fares, the third icon associated with passengers having tickets or passes checked while on the vehicle, and the fourth icon associated with passengers having traveled beyond approved limits while on the vehicle, and wherein the icons corresponding to each passenger located in the first carriage are displayed at positions on the first map according to the locations of the passengers based on the tracking of movements and locations on the vehicle of each of the plurality of passengers;

determining that the mobile device has moved to a second carriage of the plurality of carriages, wherein determining that the mobile device has moved to the second carriage includes using the detector data from the one or more cameras to determine an updated location of the conductor associated with the mobile device;

transmitting, to the mobile device, a second map corresponding to a second layout of the second carriage, wherein receiving the second map at the mobile device facilitates displaying the second map on the display device of the mobile device; and transmitting, using the wireless transceiver, locations for each of the plurality of passengers that are located in the second carriage, wherein receiving the locations for each of the plurality of passengers that are located in the second carriage facilitates the mobile device displaying icons for each of the plurality of passengers that are located in the second carriage on the second map displayed on the display device, wherein the icons are selected from the first icon, the second icon, the third icon, and the fourth icon, and wherein the icons corresponding to each passenger located in the second carriage are displayed at positions on the second map according to the locations of the passengers based on the tracking of movements and locations on the vehicle of each of the plurality of passengers.

18. The computer program product of claim 17, wherein tracking includes:

comparing a first image from a camera of the one or more cameras with a second later image from the camera to detect a change between a portion of the second later image and the first image;

performing one or more facial recognition functions on the portion of the second later image that has changed relative to the first image;

wherein, when a new passenger face is identified, a new unique identifier is stored in the database along with passenger location information for the new passenger face; and wherein, when a known passenger face is identified, but it is not new, the passenger location information in the database is updated.

* * * * *